| (12) | United States Patent<br>Zhang et al. | (10) Patent No.: US 10,287,032 B2<br>(45) Date of Patent: May 14, 2019 |
|---|---|---|

(54) UNMANNED AERIAL VEHICLE, IMAGE PHOTOGRAPHING APPARATUS AND GIMBAL THEREOF

(71) Applicant: AUTEL ROBOTICS CO., LTD., Shenzhen, Guangdong (CN)

(72) Inventors: Zhengli Zhang, Guangdong (CN); Fazhan Chen, Jiangsu (CN)

(73) Assignee: AUTEL ROBOTICS CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 15/971,416

(22) Filed: May 4, 2018

(65) Prior Publication Data

US 2018/0273203 A1  Sep. 27, 2018

Related U.S. Application Data

(63) Continuation of application No. PCT/CN2016/092765, filed on Aug. 1, 2016.

(30) Foreign Application Priority Data

Nov. 6, 2015 (CN) .................... 2015 2 0881184 U

(51) Int. Cl.
    *B64D 47/08*     (2006.01)
    *B64C 39/02*     (2006.01)
    (Continued)

(52) U.S. Cl.
    CPC ............ *B64D 47/08* (2013.01); *B64C 39/024* (2013.01); *F16M 11/18* (2013.01);
    (Continued)

(58) Field of Classification Search
    None
    See application file for complete search history.

(56) References Cited

U.S. PATENT DOCUMENTS

2013/0038792 A1\* 2/2013 Quigley ................. A61H 19/00
                                                              348/515
2014/0218603 A1   8/2014 Stone
                      (Continued)

FOREIGN PATENT DOCUMENTS

CN    101742121 A    6/2010
CN    203601575 U    5/2014
                (Continued)

OTHER PUBLICATIONS

International Search Report dated Oct. 18, 2016; PCT/CN2016092765.

(Continued)

*Primary Examiner* — William B Perkey
(74) *Attorney, Agent, or Firm* — Ladas & Parry LLP

(57) ABSTRACT

The present application relates to a gimbal configured to mount a photographing device. The gimbal includes a main body, a mounting shaft connected to the main body and a base disposed on the mounting shaft. The base is configured to fasten the photographing device. The gimbal further includes a fixing plate disposed on the base and a circuit board mounted between the fixing plate and the base. The circuit board is provided with a USB input interface and a USB output interface. The USB input interface is configured to form a data transmission connection to the photographing device. The USB output interface is configured to be connected to an external storage device. The present application further relates to an image photographing apparatus including the foregoing gimbal and an unmanned aerial vehicle including the foregoing image photographing apparatus.

10 Claims, 2 Drawing Sheets

(51) Int. Cl.
  *F16M 13/02* (2006.01)
  *G03B 15/00* (2006.01)
  *G03B 17/56* (2006.01)
  *F16M 11/18* (2006.01)
(52) U.S. Cl.
  CPC ......... *F16M 13/022* (2013.01); *G03B 15/006* (2013.01); *G03B 17/561* (2013.01); *B64C 2201/123* (2013.01)

(56) References Cited

U.S. PATENT DOCUMENTS

| | | | | |
|---|---|---|---|---|
| 2016/0352992 | A1* | 12/2016 | Saika | H04N 5/2328 |
| 2017/0078538 | A1* | 3/2017 | Zhu | H04N 5/232 |
| 2017/0227162 | A1* | 8/2017 | Saika | F16M 13/02 |
| 2017/0301230 | A1* | 10/2017 | Liu | G03B 17/561 |
| 2018/0244365 | A1* | 8/2018 | Fisher | B64C 1/069 |

FOREIGN PATENT DOCUMENTS

| | | |
|---|---|---|
| CN | 203859813 U | 10/2014 |
| CN | 104380725 A | 2/2015 |
| CN | 204279973 U | 4/2015 |
| CN | 205101801 U | 3/2016 |
| EP | 1912015 A2 | 4/2008 |
| WO | 2015/165022 A1 | 11/2015 |

OTHER PUBLICATIONS

This reference is in a video format found at: https://www.youtube.com/watch? v = hKbg2vpapd0 published Jul. 7, 2015

* cited by examiner

UNMANNED AERIAL VEHICLE, IMAGE PHOTOGRAPHING APPARATUS AND GIMBAL THEREOF

CROSS-REFERENCE

This application is a continuation application of International Application No. PCT/CN2016/092765, filed on Aug. 1, 2016, which claims priority of Chinese Patent Application No. 201520881184.7, filed on Nov. 6, 2015, which is incorporated herein by reference in its entirety.

BACKGROUND

Technical Field

The present application relates to the field of image photographing devices, and in particular, to an image photographing apparatus, a gimbal thereof and an unmanned aerial vehicle mounted with the image photographing apparatus.

Related Art

As people have increasingly high requirements on an image photographing effect, a gimbal is gradually applied to mount a photographic device on the gimbal. Various photographing angles such as a horizontal angle or a pitch angle are shown on the gimbal, and photographing may be performed with a stable posture, thereby obtaining an image whose photographing effect is greatly improved.

A camera of an existing image photographing apparatus is fastened to the gimbal. Because of a unique fixing structure of the gimbal, the camera needs to be connected to an external data storage apparatus after being dismounted from the gimbal, thereby completing transmission of image information obtained by the camera by photographing. Transmission of image information needs mounting and dismounting of the camera each time. This is not convenient to use.

SUMMARY

An object of the present application is to provide an unmanned aerial vehicle, an image photographing apparatus and a gimbal thereof. This can resolve problems that data transmission of a photographing device in an image photographing apparatus is complex and repeatedly dismounting and mounting the photographing device leads to abrasion of the photographing device and a gimbal, shortening service lives.

The present application adopts the following technical solutions: A gimbal is configured to mount a photographing device. The gimbal includes a main body, a mounting shaft connected to the main body and a base disposed on the mounting shaft. The base is configured to fasten the photographing device. The gimbal further includes a fixing plate disposed on the base and a circuit board mounted between the fixing plate and the base. The circuit board is provided with a USB input interface and a USB output interface. The USB input interface is configured to form a data transmission connection to the photographing device. The USB output interface is configured to be connected to an external storage device.

In some embodiments, the base is L-shaped and includes a first supporting plate and a second supporting plate. The photographing device is fastened to the first supporting plate. The fixing plate is disposed on the second supporting plate. The circuit board is sandwiched between the second supporting plate and the fixing plate.

In some embodiments, a mounting sleeve is disposed on a side of the second supporting plate opposite to the circuit board. The mounting sleeve is sleeved on the mounting shaft to fixedly connect the base and the mounting shaft.

In some embodiments, an insertion/removal direction of the USB output interface is perpendicular to an axial direction of the mounting shaft.

In some embodiments, the USB output interface is located between the fixing plate and the mounting sleeve.

In some embodiments, a side of the circuit board abutting against the second supporting plate further abuts against the mounting sleeve and the mounting shaft.

In some embodiments, the fixing plate is provided with a through hole to expose the USB input interface. One side of the fixing plate is the circuit board, and the other side of the fixing plate is connected to the photographing device by using the USB input interface.

In some embodiments, insertion/removal directions of the USB input interface and the USB output interface are different.

An image photographing apparatus includes any of the foregoing gimbals and the photographing device mounted on the gimbal. The photographing device includes a USB transmission interface. The USB transmission interface performs data transmission with the USB input interface provided on the circuit board on the gimbal.

An unmanned aerial vehicle includes any of the foregoing image photographing apparatuses and a main vehicle body. The image photographing apparatus is connected to the main vehicle body.

Compared with the prior art, beneficial effects of the present application lie in that: when data information in the photographing device needs to be accessed, the photographing device does not need to be dismounted from the gimbal. A further processing operation may be directly performed on the data information in the photographing device by connecting the USB output interface to the external storage device. Therefore, a trouble of repeatedly dismounting and mounting the photographing device can be avoided. Friction losses of related structures of the photographing device and the gimbal are avoided, thereby prolonging service lives of the components.

BRIEF DESCRIPTION OF THE DRAWINGS

To describe the technical solutions in the embodiments of the present application more clearly, the following briefly describes the accompanying drawings required for the embodiments of the present application. Apparently, the accompanying drawings in the following description show merely some embodiments of the present application, and a person of ordinary skill in the art may still derive other drawings from these accompanying drawings without creative efforts.

DETAILED DESCRIPTION

To make the objectives, technical solutions, and advantages of the present application clearer and more comprehensible, the following further describes the present application in detail with reference to the accompanying drawings and embodiments. It should be understood that the specific embodiments described herein are merely used to explain the present application, but are not intended to limit the present application.

In addition, technical features related to each implementation of the present application described below can be combined with each other as long as they do not contradict each other.

Figure 1:
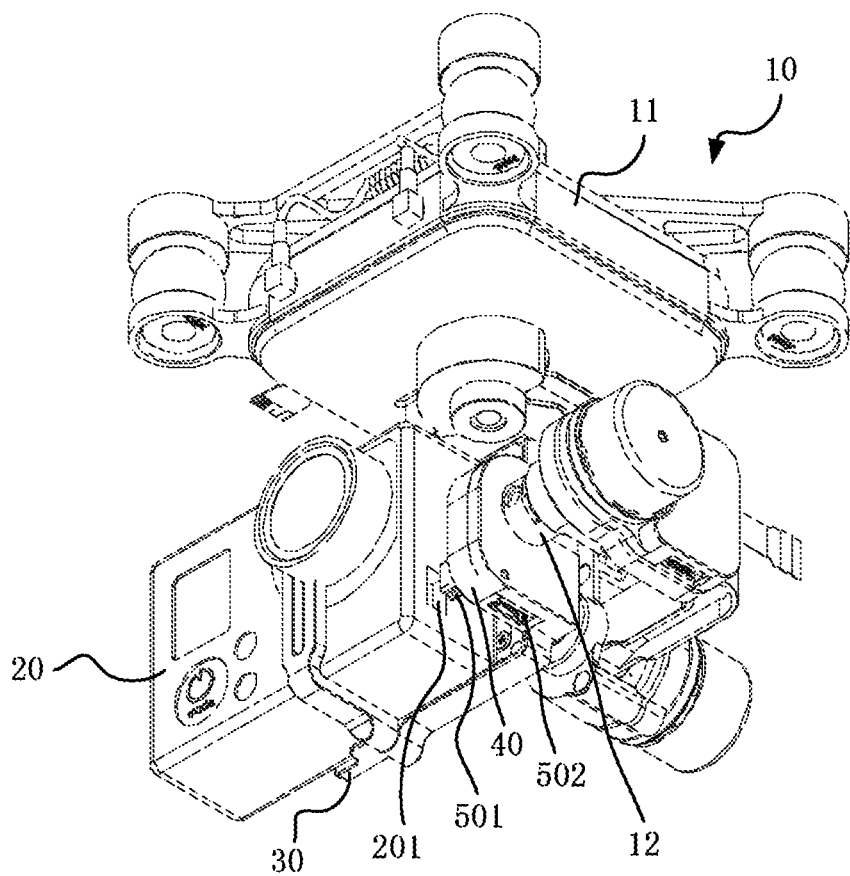
FIG. 1 is a schematic diagram of an overall structure of an image photographing apparatus according to an embodiment of the present application.
Figure 2:
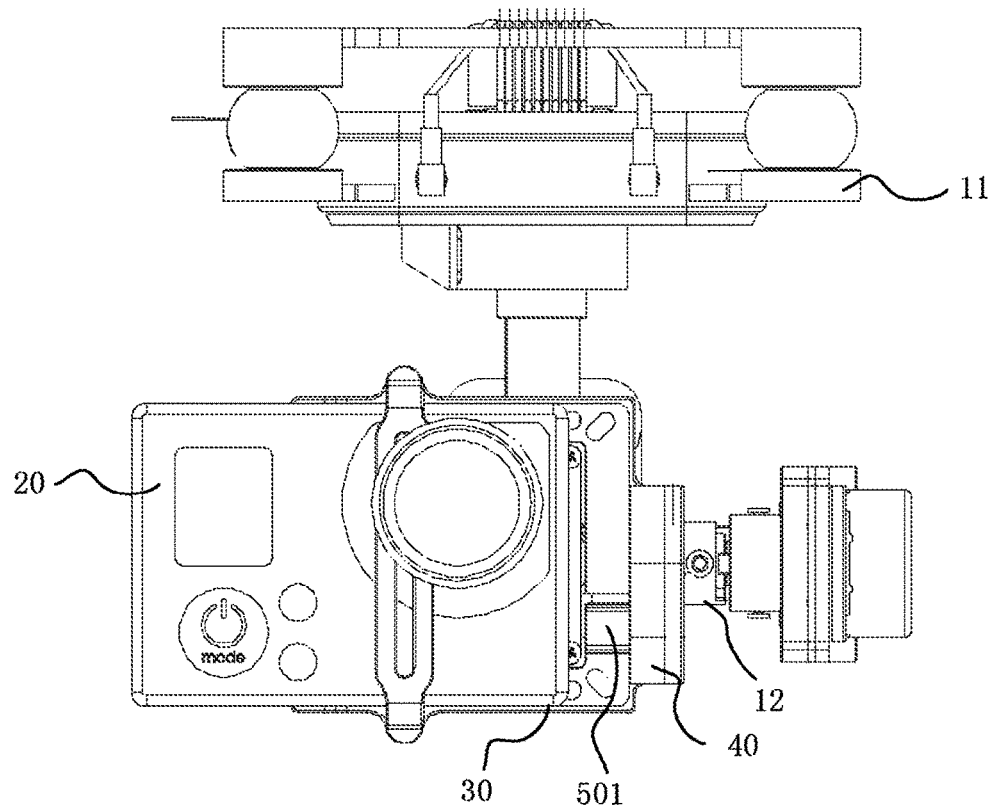
FIG. 2 is a schematic main view of the image photographing apparatus shown in FIG. 1.

As shown in FIG. 1 and FIG. 2, an image photographing apparatus provided in an embodiment of the present application includes a gimbal 10 and a photographing device 20 disposed on the gimbal 10. The photographing device 20 may be a camera or a video camera, and may be configured to capture dynamic or static image information and to store the image information. The photographing device 20 includes a USB transmission interface 201. The photographing device 20 may be connected to an external storage device by using the USB transmission interface 201, for example, a computer and a removable hard disk, thereby transferring the image information in the photographing device 20 and satisfying other demands such as further processing.

The gimbal 10 includes a main body 11 and a mounting shaft 12 disposed on the main body 11. The mounting shaft 12 is configured to be connected to a base 30 that may be mounted with the photographing device 20, thereby fastening the photographing device 20 to the gimbal 10.

In the foregoing embodiment, the main body 11 is a three-axis aerial photographing main body. For example, the main body 11 may further include mechanisms such as a turnover support, a yaw support, a pitching motor, a turnover motor and a yaw motor. The mechanisms may control the photographing device 20 to implement moving and positioning on a three-dimensional space, thereby providing the photographing device 20 with various photographing angles and postures, to enrich image content and improve image quality. When the main body 11 is the three-axis aerial photographing main body, the mounting shaft 12 may be fixedly connected to the turnover support or the yaw support. By using a fixed connection between the main body 11 and the mounting shaft 12, switching of each action and fixing of each posture of the three-axis aerial photographing main body can be transmitted to the photographing device 20 disposed on the base 30.

Figure 3:
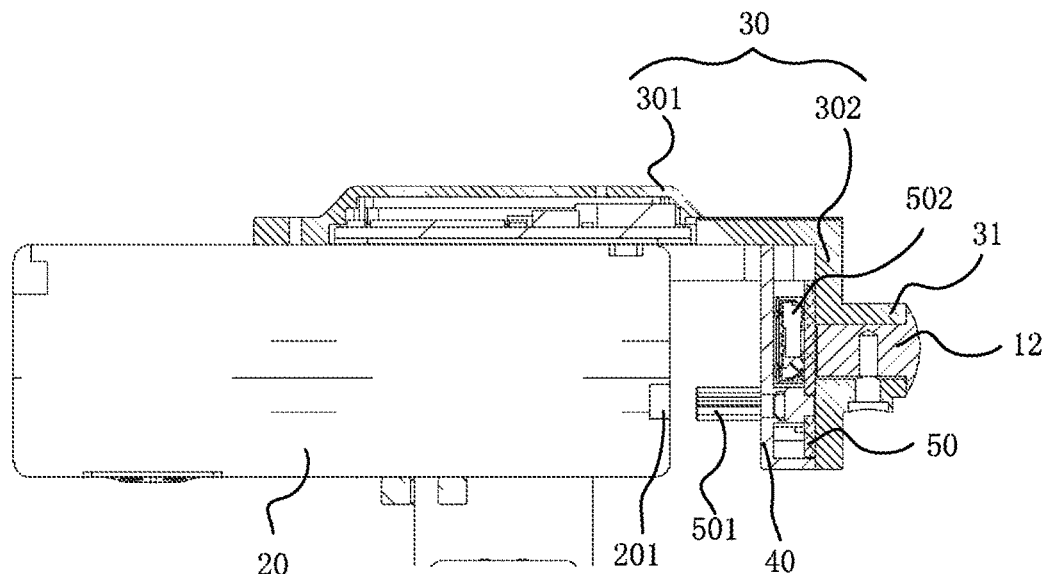
FIG. 3 is a schematic sectional view of a part of the structure of the image photographing apparatus shown in FIG. 2.

Together referring to FIG. 3, the gimbal 10 further includes a fixing plate 40 disposed on the base 30 and a circuit board 50 mounted between the fixing plate 40 and the base 30. The circuit board 50 is provided with a USB input interface 501 and a USB output interface 502. The USB input interface 501 is configured to form a data transmission connection to the photographing device 20. The USB output interface 502 is configured to be connected to an external storage device. Specifically, when the photographing device 20 is fixedly mounted on the base 30, the USB input interface 501 and the USB transmission interface 201 on the photographing device 20 form a data transmission connection. Therefore, in the image photographing apparatus and the gimbal thereof provided in the present application, when data information in the photographing device 20 needs to be accessed, the photographing device 20 does not need to be dismounted from the gimbal 10. A further processing operation may be directly performed on the data information in the photographing device 20 by connecting the USB output interface 502 to the external storage device. Therefore, a trouble of repeatedly dismounting and mounting the photographing device 20 can be avoided. Friction losses of related structures of the photographing device 20 and the gimbal 10 are avoided, thereby prolonging service lives of the components.

Further, the base 30 is approximately L-shaped and includes a first supporting plate 301 and a second supporting plate 302. The first supporting plate 301 is approximately perpendicular to the second supporting plate 302. The photographing device 20 is fastened to the first supporting plate 301. The fixing plate 40 is disposed on the second supporting plate 302. The circuit board 50 is sandwiched between the second supporting plate 302 and the fixing plate 40.

The base 30 is provided with a mounting sleeve 31. Specifically, the mounting sleeve 31 extends from a side of the second supporting plate 302. The mounting sleeve 31 and the circuit board 50 are respectively located on two opposite sides of the second supporting plate 302. That is, the mounting sleeve 31 is disposed on a side of the second supporting plate 302 opposite to the circuit board 50. The mounting sleeve 31 is sleeved on the mounting shaft 12, thereby fixedly mounting the mounting shaft 12 on the base 30. Specifically, the mounting sleeve 31 is provided with a fastening screw. A fixed connection between the base 30 and the mounting shaft 12 may form by using the fastening screw.

Further, an insertion/removal direction of the USB output interface 502 is perpendicular to an axial direction of the mounting shaft 12. It can be understood that the insertion/removal direction of the USB output interface 502 and an insertion/removal direction of the USB input interface 501 refer to an insertion/removal direction of a USB device (for example, a USB data line or a USB storage) when the interfaces are connected to the USB device. It can be clearly seen from FIG. 1, The USB output interface 502 is oriented downwards. The insertion/removal direction is a vertical direction and has a vertical relationship with the mounting shaft 12 that extends in a horizontal direction. The USB input interface 501 and the axial direction of the mounting shaft 12 are basically parallel, but are not coaxial, and have a stereoscopically staggered position relationship. Insertion/removal directions of the USB output interface 502 and the USB input interface 501 are different, so that the USB output interface 502 has larger connection space. It is avoided that the related structures of the photographing device 20 and the gimbal 10 block the USB output interface 502, thereby facilitating the connection between the USB output interface 502 and the external storage device.

As shown in FIG. 1 and FIG. 3, the circuit board 50 is sandwiched between the fixing plate 40 and the second supporting plate 302, so that the USB output interface 502 is also located between the fixing plate 40 and the second supporting plate 302.

The USB input interface 501 is exposed from the fixing plate 40, to be connected to the photographing device 20 disposed on the base 30. The fixing plate 40 is provided with a through hole (not shown) to expose the USB input interface 501. One side of the fixing plate 40 is the circuit board 50, and the other side of the fixing plate 40 is connected to the photographing device 20 by using the USB input interface 501.

As shown in FIG. 3, a side of the circuit board 50 abutting against the second supporting plate further abuts against the mounting sleeve 31 and the mounting shaft 12. The fixing plate 40 covers on the second supporting plate 302 of the base 30, and fastens the circuit board 50. It can be understood that structures such as a slide rail and a mounting rib may further be disposed on the first supporting plate 301 of the base 30, to facilitate mounting and fastening of the photographing device 20.

In the present application, a circuit board 50 is connected to and disposed on the base 30 that fastens the photographing device 20, and a corresponding USB transferring interface is disposed on the circuit board 50, thereby simplifying a data transmission manner of the photographing device 20 on the gimbal 10, reducing risk of friction losses during dismounting of the gimbal 10 and the photographing device 20 and prolonging a service life of a related device. During actual use, only a USB transmission data line is needed so that real-time data or stored data in the photographing device 20 fastened to the gimbal 10 can be transmitted to a data storage device such as a mobile device of a user. This provides better user experience.

The present application further provides an unmanned aerial vehicle that includes the foregoing image photographing apparatus. The unmanned aerial vehicle includes a main vehicle body. The image photographing apparatus is connected to the main vehicle body.

The foregoing descriptions are merely preferred embodiments of the present application, but are not intended to limit the present application. Any modification, equivalent replacement, or improvement made within the spirit and principle of the present application shall fall within the protection scope of the present application.

What is claimed is:

1. A gimbal, configured to mount a photographing device, the gimbal comprising:
   a main body;
   a mounting shaft, connected to the main body, and
   a base, disposed on the mounting shaft, the base being configured to fasten the photographing device;
   the gimbal further comprising:
   a fixing plate, disposed on the base, and
   a circuit board, mounted between the fixing plate and the base, the circuit board being provided with a USB input interface and a USB output interface, the USB input interface being configured to form a data transmission connection to the photographing device, and the USB output interface being configured to be connected to an external storage device.

2. The gimbal according to claim 1, wherein the base is L-shaped and comprises a first supporting plate and a second supporting plate, the photographing device being fastened to the first supporting plate, the fixing plate being disposed on the second supporting plate, and the circuit board being sandwiched between the second supporting plate and the fixing plate.

3. The gimbal according to claim 2, wherein a mounting sleeve is disposed on a side of the second supporting plate opposite to the circuit board, and the mounting sleeve being sleeved on the mounting shaft to fixedly connect the base and the mounting shaft.

4. The gimbal according to claim 3, wherein an insertion/removal direction of the USB output interface is perpendicular to an axial direction of the mounting shaft.

5. The gimbal according to claim 3, wherein the USB output interface is located between the fixing plate and the mounting sleeve.

6. The gimbal according to claim 3, wherein a side of the circuit board abutting against the second supporting plate further abuts against the mounting sleeve and the mounting shaft.

7. The gimbal according to claim 2, wherein the fixing plate is provided with a through hole to expose the USB input interface, one side of the fixing plate being the circuit board, and the other side of the fixing plate being connected to the photographing device by using the USB input interface.

8. The gimbal according to claim 7, wherein insertion/removal directions of the USB input interface and the USB output interface are different.

9. An image photographing apparatus, comprising the gimbal according to claim 1 and the photographing device mounted on the gimbal, wherein the photographing device comprises a USB transmission interface, the USB transmission interface performing data transmission with the USB input interface provided on the circuit board on the gimbal.

10. An unmanned aerial vehicle, comprising the image photographing apparatus according to claim 9 and a main vehicle body, wherein the image photographing apparatus is connected to the main vehicle body.

* * * * *